US012217494B2

United States Patent
Schmidt

(10) Patent No.: US 12,217,494 B2
(45) Date of Patent: Feb. 4, 2025

(54) KEYFRAME EXTRACTOR

(71) Applicant: Gracenote, Inc., Emeryville, CA (US)

(72) Inventor: Andreas Schmidt, San Pablo, CA (US)

(73) Assignee: Gracenote, Inc., New York, NY (US)

( * ) Notice: Subject to any disclaimer, the term of this patent is extended or adjusted under 35 U.S.C. 154(b) by 632 days.

(21) Appl. No.: 17/224,034

(22) Filed: Apr. 6, 2021

(65) Prior Publication Data

US 2021/0319230 A1    Oct. 14, 2021

Related U.S. Application Data

(60) Provisional application No. 63/008,477, filed on Apr. 10, 2020.

(51) Int. Cl.
*G06V 10/82* (2022.01)
*G06F 18/24* (2023.01)
(Continued)

(52) U.S. Cl.
CPC .............. *G06V 10/82* (2022.01); *G06F 18/24* (2023.01); *G06F 18/2413* (2023.01);
(Continued)

(58) Field of Classification Search
CPC ........... H04N 21/812; H04N 21/23424; H04N 5/147; H04N 21/233; H04N 21/23418;
(Continued)

(56) References Cited

U.S. PATENT DOCUMENTS 9,905,267 B1 * 2/2018 Roberts ................. G06V 20/48
2003/0120152 A1 * 6/2003 Omiya ..................... A61B 8/08
600/443

(Continued)

FOREIGN PATENT DOCUMENTS

KR           100465587 B1     1/2005
KR    10-2017-0070420 A       6/2017
(Continued)

OTHER PUBLICATIONS

Zhang, Zheng, et al. "Focus and blurriness measure using reorganized DCT coefficients for an autofocus application." IEEE Transactions on Circuits and Systems for Video Technology 28.1 (2018): 15-30.*

(Continued)

*Primary Examiner* — Xuemei G Chen
(74) *Attorney, Agent, or Firm* — McDonnell Boehnen Hulbert & Berghoff LLP

(57) ABSTRACT

In one aspect, an example method includes (i) determining a blur delta that quantifies a difference between a level of blurriness of a first frame of a video and a level of blurriness of a second frame of the video, wherein the second frame is subsequent to and adjacent to the first frame; (ii) determining a contrast delta that quantifies a difference between a contrast of the first frame and a contrast of the second frame; (iii) determining a fingerprint distance between a first image fingerprint of the first frame and a second image fingerprint of the second frame; (iv) determining a keyframe score using the blur delta, the contrast delta, and the fingerprint distance; (v) based on the keyframe score, determining that the second frame is a keyframe; and (vi) outputting data indicating that the second frame is a keyframe.

17 Claims, 5 Drawing Sheets

(51) Int. Cl.

| | |
|---|---|
| *G06F 18/2413* | (2023.01) |
| *G06N 3/049* | (2023.01) |
| *G06N 3/08* | (2023.01) |
| *G06V 10/80* | (2022.01) |
| *G06V 20/40* | (2022.01) |
| *H04N 21/234* | (2011.01) |
| *H04N 21/81* | (2011.01) |

(52) U.S. Cl.
CPC ............... *G06N 3/049* (2013.01); *G06N 3/08* (2013.01); *G06V 10/806* (2022.01); *G06V 20/41* (2022.01); *G06V 20/46* (2022.01); *H04N 21/23424* (2013.01); *H04N 21/812* (2013.01)

(58) Field of Classification Search
CPC . H04N 21/2547; G06F 18/24; G06F 18/2413; G06N 3/049; G06N 3/08; G06N 3/044; G06N 3/045; G06V 10/806; G06V 20/41; G06V 20/46; G11B 27/28
See application file for complete search history.

(56) References Cited

U.S. PATENT DOCUMENTS

| | | | |
|---|---|---|---|
| 2004/0120598 A1* | 6/2004 | Feng | G06T 5/73 382/263 |
| 2004/0243817 A1 | 12/2004 | Hasegawa et al. | |
| 2005/0086027 A1* | 4/2005 | Li | G06T 7/277 |
| 2005/0138673 A1* | 6/2005 | Li | G06F 16/785 725/135 |
| 2005/0149557 A1* | 7/2005 | Moriya | H04N 21/235 |
| 2007/0188787 A1* | 8/2007 | Aiso | H04N 1/00188 358/1.9 |
| 2007/0263128 A1 | 11/2007 | Zhang | |
| 2009/0096897 A1* | 4/2009 | Saito | H04N 23/80 348/241 |
| 2009/0220109 A1 | 9/2009 | Crockett et al. | |
| 2011/0157475 A1* | 6/2011 | Wright | H04H 20/14 348/700 |
| 2013/0011036 A1* | 1/2013 | Marugame | H04N 1/60 382/128 |
| 2013/0163888 A1 | 6/2013 | Montalvo et al. | |
| 2013/0198783 A1* | 8/2013 | Chen | H04N 21/27 725/39 |
| 2018/0197577 A1 | 7/2018 | Farre Guiu et al. | |
| 2019/0027188 A1 | 1/2019 | Akolkar | |
| 2019/0197362 A1* | 6/2019 | Campanella | G06V 10/30 |
| 2019/0289372 A1 | 9/2019 | Merler | |
| 2021/0327070 A1* | 10/2021 | Wang | G06T 7/11 |
| 2023/0289383 A1* | 9/2023 | Harron | G06F 16/434 707/749 |

FOREIGN PATENT DOCUMENTS

| | | |
|---|---|---|
| KR | 10-2019-0037056 A | 4/2019 |
| WO | 2015038749 A1 | 3/2015 |

OTHER PUBLICATIONS

Marichal et al., Blur Determination in the Compressed Domain Using DCT Information, 5 pages.

International Search Report for International Patent Application No. PCT/US2021/026276, mailed Jul. 27, 2021, 43 pages.

Written Opinion for International Patent Application No. PCT/US2021/026276, mailed Jul. 27, 2021, 4 pages.

Marichal, Xavier et al., "Blur Determination in the Compressed Domain Using DCT Information" Proceedings 1999 International Conference on Image Processing, IEEE, Oct. 1999.

* cited by examiner

KEYFRAME EXTRACTOR

CROSS-REFERENCE TO RELATED APPLICATIONS

This disclosure claims priority to U.S. Provisional Patent App. No. 63/008,477, filed on Apr. 10, 2020, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

In various scenarios, a content distribution system can transmit content to a content presentation device, which can receive and output the content for presentation to an end-user. Further, such a content distribution system can transmit content in various ways and in various forms. For instance, a content distribution system can transmit content in the form of an analog or digital broadcast stream representing the content.

In an example configuration, a content distribution system can transmit content on one or more discrete channels (sometimes referred to as stations or feeds). A given channel can include content arranged as a linear sequence of content segments, including, for example, program segments, advertisement segments (e.g., commercials), and promotion segments.

SUMMARY

In one aspect, an example method is disclosed. The method includes (i) determining, by a computing system, a blur delta that quantifies a difference between a level of blurriness of a first frame of a video and a level of blurriness of a second frame of the video, the second frame being subsequent to and adjacent to the first frame; (ii) determining, by the computing system, a contrast delta that quantifies a difference between a contrast of the first frame and a contrast of the second frame; (iii) determining, by the computing system, a fingerprint distance between a first image fingerprint of the first frame and a second image fingerprint of the second frame; (iv) determining, by the computing system, a keyframe score using the blur delta, the contrast delta, and the fingerprint distance; (v) based on the keyframe score, determining, by the computing system, that the second frame is a keyframe; and (vi) outputting, by the computing system, data indicating that the second frame is a keyframe.

In another aspect, an example non-transitory computer-readable medium is disclosed. The computer-readable medium has stored thereon program instructions that upon execution by a processor, cause performance of a set of acts including (i) determining a blur delta that quantifies a difference between a level of blurriness of a first frame of a video and a level of blurriness of a second frame of the video, the second frame being subsequent to and adjacent to the first frame; (ii) determining a contrast delta that quantifies a difference between a contrast of the first frame and a contrast of the second frame; (iii) determining a fingerprint distance between a first image fingerprint of the first frame and a second image fingerprint of the second frame; (iv) determining a keyframe score using the blur delta, the contrast delta, and the fingerprint distance; (v) based on the keyframe score, determining that the second frame is a keyframe; and (vi) outputting data indicating that the second frame is a keyframe.

In another aspect, an example computing system is disclosed. The computing system is configured for performing a set of acts including (i) determining a blur delta that quantifies a difference between a level of blurriness of a first frame of a video and a level of blurriness of a second frame of the video, the second frame being subsequent to and adjacent to the first frame; (ii) determining a contrast delta that quantifies a difference between a contrast of the first frame and a contrast of the second frame; (iii) determining a fingerprint distance between a first image fingerprint of the first frame and a second image fingerprint of the second frame; (iv) determining a keyframe score using the blur delta, the contrast delta, and the fingerprint distance; (v) based on the keyframe score, determining that the second frame is a keyframe; and (vi) outputting data indicating that the second frame is a keyframe.

DETAILED DESCRIPTION

I. Overview

Figure 1:
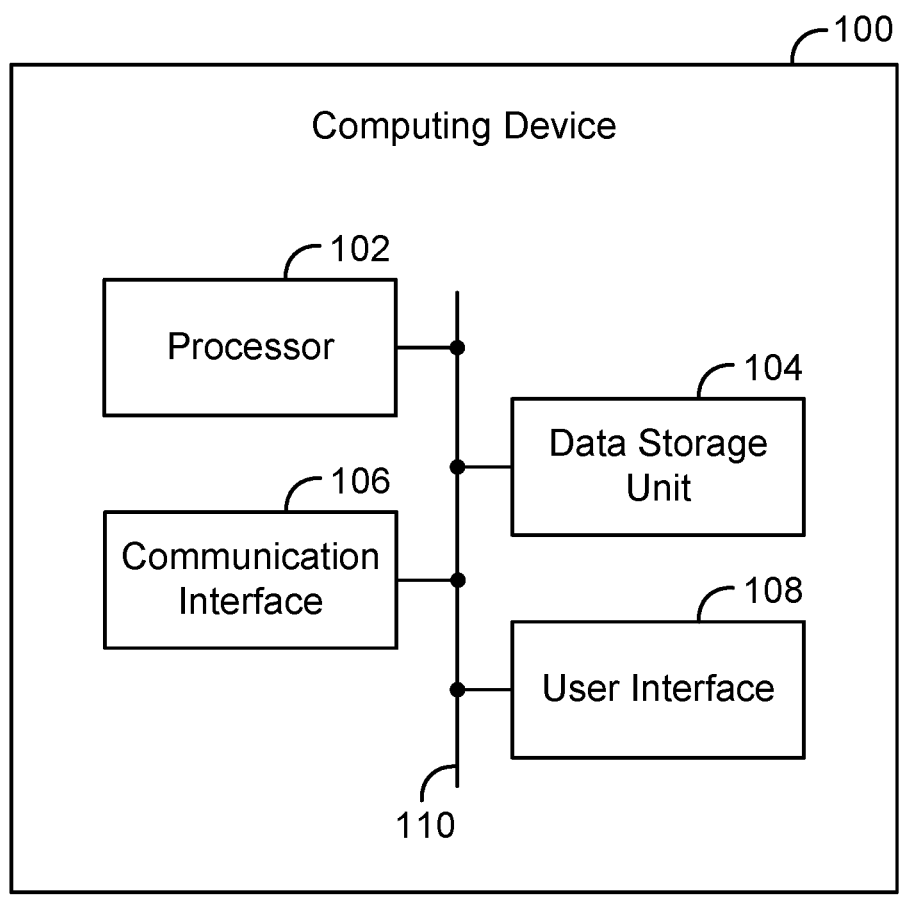
FIG. 1 is a simplified block diagram of an example computing device.

In the context of an advertisement system, it can be useful to know when and where advertisements are inserted. For instance, it may be useful to understand which channel(s) an advertisement airs on, the dates and times that the advertisement aired on that channel, etc. Further, it may also be beneficial to be able to obtain copies of advertisements that are included within a linear sequence of content segments. For instance, a user of the system may wish to review the copies to confirm that an advertisement was presented as intended (e.g., to confirm that an advertisement was presented in its entirety to the last frame). In addition, for purposes of implementing an audio and/or video fingerprinting system, it may be desirable to have accurate copies of advertisements that can be used to generate reference fingerprints.

Still further, in some instances, when media content, such as a television show, is provided with advertisements that are inserted between program segments, it may be useful to obtain a copy of the television show from which the advertisements have been removed. This can allow a fingerprinting system to more granularly track and identify a location in time within the television show when a fingerprint of the television show is obtained from the television show during a scenario in which the television show is being presented without advertisements. The television show might not include advertisements, for instance, when the television show is presented via an on-demand streaming service at a later time than a time at which the television was initially broadcast or streamed.

Video content can include a plurality of frames, or images, that are presented in sequence to create a moving picture. Each frame can include pixel intensity values for respective pixels of a plurality of pixels. The pixel intensity values can be expressed in a color space, such as a red, green, blue (RGB) color space or grayscale.

Video content can include a number of shots. A shot of video content includes consecutive frames which show a continuous progression of video and which are thus interrelated. In addition, video content can include solid color frames that are substantially black, referred to as blackframes. A video editor can insert blackframes between shots of a video, or even within shots of a video. Additionally or alternatively, blackframes can be inserted between program segments and advertisement segments, between different program segments, or between different advertisement segments.

For many frames of video content, there is minimal change from one frame to another. However, for other frames of video content, referred to as keyframes, there is a significant visual change from one frame to another. As an example, for video content that includes a program segment followed by an advertisement segment, a first frame of the advertisement segment may be significantly different from a last frame of the program segment such that the first frame is a keyframe. As another example, a frame of an advertisement segment or a program segment following a blackframe may be significantly different from the blackframe such that the frame is a keyframe. As yet another example, a segment can include a first shot followed by a second shot. A first frame of the second shot may be significantly different from a last frame of the first shot such that the first frame of the second shot is a keyframe.

Information regarding the locations of keyframes within video content is a useful tool for video processing. For instance, the locations of keyframes can be used to help separate video content into program segments and advertisement segments. As another example, the locations of keyframes can be used to help identify repetitive content (e.g., repeated advertisement segments) within videos.

Disclosed herein are methods and systems for detecting keyframes within video content. In an example method, a computing system can determine a blur delta that quantifies a difference between a level of blurriness of a first frame of a video and a level of blurriness of a second frame of the video, with the second frame being subsequent to and adjacent to the first frame. In addition, the computing system can determine a contrast delta that quantifies a difference between a contrast of the first frame and a contrast of the second frame. Further, the computing system can determine a fingerprint distance between a first image fingerprint of the first frame and a second image fingerprint of the second frame. The computing system can then determine a keyframe score using the blur delta, the contrast delta, and the fingerprint distance. Based on the keyframe score, the computing system can determine that the second frame is a keyframe. And the computing system can output data indicating that the second frame is a keyframe.

In some examples, by combining information about the difference between levels of blurriness, the difference between contrasts, and the fingerprint distance, the computing system can discern, with frame-level accuracy, the locations of keyframes within video content. Further, the approach is relatively lightweight from a computational standpoint since the approach can be carried out for any pair of adjacent frames of a video without having to store historical information for a group of consecutive frames (e.g., frames of a shot of the video).

Various other features of the example method discussed above, as well as other methods and systems, are described hereinafter with reference to the accompanying figures.

II. Example Architecture

A. Computing Device

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of computing device 100.

B. Computing System

Figure 2:
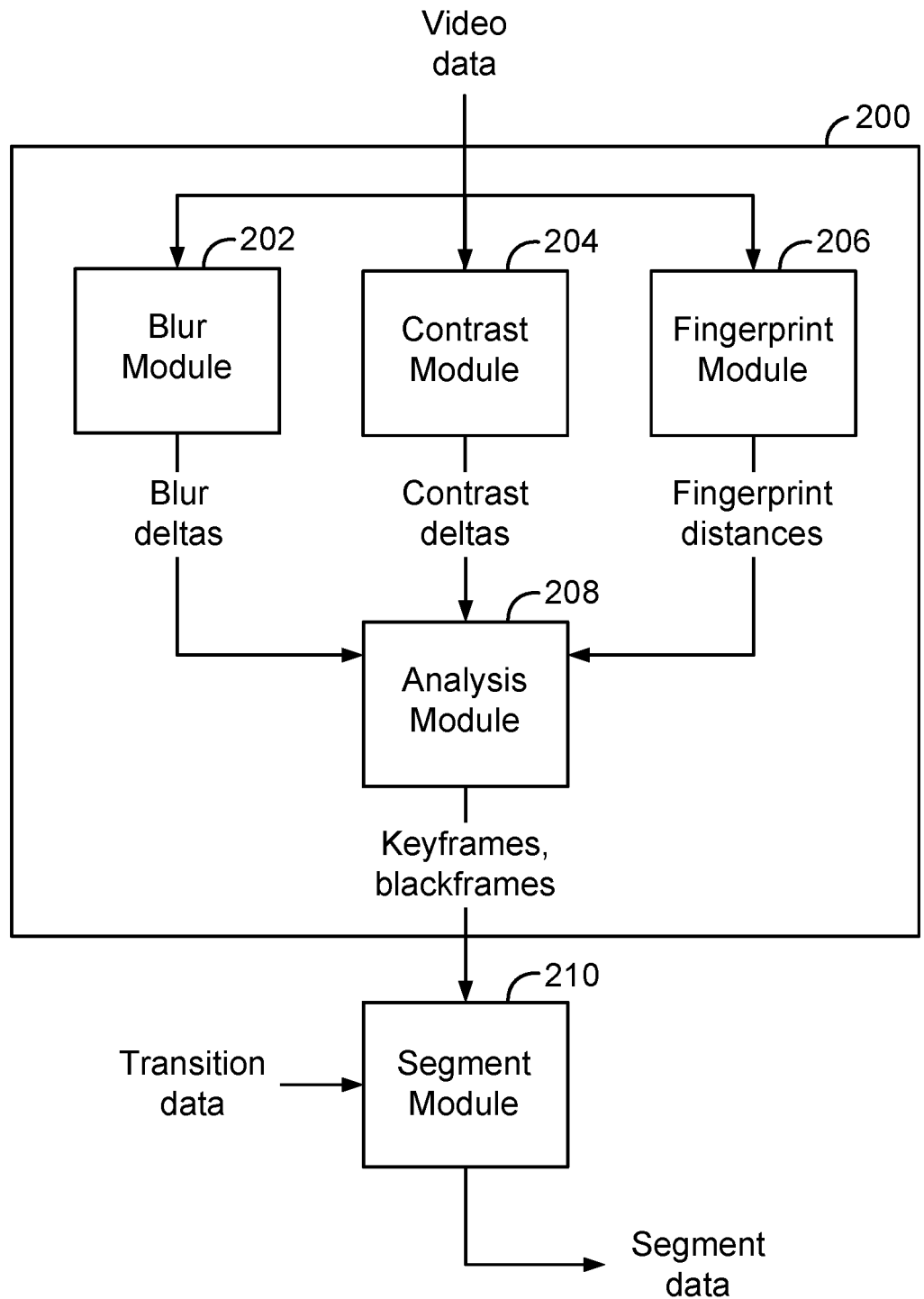
FIG. 2 is a simplified block diagram of an example computing system in which various described principles can be implemented.

FIG. 2 is a simplified block diagram of an example computing system 200. Computing system 200 can perform various acts and/or functions related to detecting keyframes within a video.

As shown in FIG. 2, computing system 200 can include various components, such as a blur module 202, a contrast module 204, a fingerprint module 206, and an analysis module 208. Each of blur module 202, contrast module 204, fingerprint module 206, and analysis module 208 can be implemented as a computing system. For instance, one or more of the components depicted in FIG. 2 can be implemented using hardware (e.g., a processor of a machine, a field-programmable gate array (FPGA), or an application-specific integrated circuit (ASIC), or a combination of hardware and software. Moreover, any two or more of the components depicted in FIG. 2 can be combined into a single component, and the function described herein for a single component can be subdivided among multiple components.

Computing system 200 can receive video data, analyze the video data, and output information regarding keyframes and, optionally, blackframes, within the video data. Video data can include a video sequence, such as a linear sequence of content segments transmitted on one or more discrete channels (sometimes referred to as stations or feeds). As such, video data can include frames representing program segments and/or advertisement segments.

In line with the discussion above, computing system 200 can analyze differences between pairs of adjacent frames within the video data to detect keyframes. For instance, blur module 202 can be configured to determine a blur delta that quantifies a difference between a level of blurriness of a first frame and a level of blurriness of a second frame, contrast module 204 can be configured to determine a contrast delta that quantifies a difference between a contrast of the first frame and a contrast of the second frame, and fingerprint module 206 can be configured to determine a fingerprint distance between a first image fingerprint of the first frame and a second image fingerprint of the second frame. Further, analysis module 208 can then be configured to use the blur delta, contrast delta, and fingerprint distance to determine whether the second frame is a keyframe. In some examples, contrast module 204 can also be configured to determine whether the first frame and/or the second frame is a blackframe based on contrast scores for the first frame and the second frame, respectively.

As further shown in FIG. 2, computing system 200 can be configured to output information regarding keyframes and blackframes to a segment module 210, for use in generating segment data. For instance, segment module 210 can be a computing system that is configured to use the information regarding keyframes and blackframes to refine transition data output by a transition detection classifier, with the transition data being indicative of locations within a video of transitions between advertisement content and program content. Additionally or alternatively, segment module 210 can be configured to identify a portion of the video data between a keyframe and a next keyframe as query segment, and search for a match to the query segment within a video database.

In some examples, segment module 210 can be included as part of computing system 200. For instance, segment module 210 can be a component of analysis module 208.

III. Example Operations

The computing system 200 and/or components thereof can be configured to perform and/or can perform one or more operations. Examples of these operations and related features will now be described.

A. Operations Related to Determining a Blur Delta

As noted above, blur module 202 can be configured to determine a blur delta for a pair of adjacent frames of a video. The blur delta can quantify a difference between a level of blurriness of a first frame and a level of blurriness of a second frame. The level of blurriness can quantify gradients between pixels of a frame. For instance, a blurry frame may have many smooth transitions between pixel intensity values of neighboring pixels. Whereas, a frame having a lower level of blurriness might have gradients that are indicative of more abrupt changes between pixel intensity values of neighboring pixels.

In one example, for each frame of a pair of frames, blur module 202 can determine a respective blur score for the frame. Further, blur module 202 can then determine a blur delta by comparing the blur score for a first frame of the pair of frames with a blur score for a second frame of the pair of frames.

Blur module 202 can determine a blur score for a frame in various ways. By way of example, blur module 202 can determine a blur score for a frame based on a discrete cosine transform (DCT) of pixel intensity values of the frame. For instance, blur module 202 can determine a blur score for a frame based on several DCTs of pixel intensity values of a downscaled, grayscale version of the frame. For a grayscale image, the pixel value of each pixel is a single number that represents the brightness of the pixel. A common pixel format is a byte image, in which the pixel value for each pixel is stored as an 8-bit integer giving a range of possible values from 0 to 255. A pixel value of 0 corresponds to black, and a pixel value of 255 corresponds to white. Further, pixel values in between 0 and 255 correspond to different shades of gray.

Figure 3:
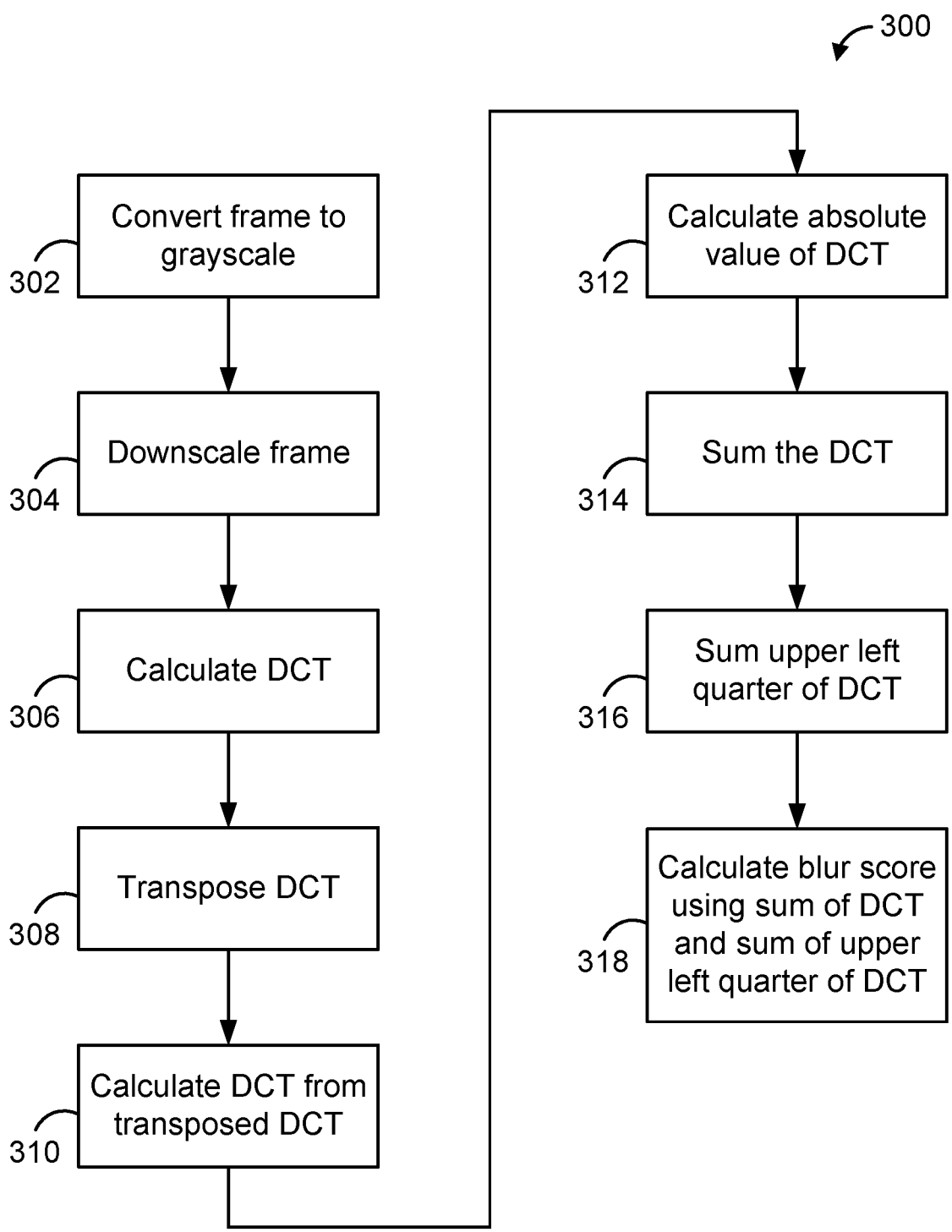
FIG. 3 illustrates an example process for determining a blur score.

FIG. 3 illustrates an example process 300 for determining a blur score. Process 300 can be carried out by a computing system, such as blur module 202 of FIG. 2. As shown in FIG. 3, at block 302, process 300 includes converting a frame to grayscale. At block 304, process 300 then includes downscaling the frame. Downscaling the frame can involve reducing the resolution of the frame by sampling groups of adjacent pixels. This can help speed up the processing of functions carried out in subsequent blocks.

Further, at block 306, process 300 includes calculating a DCT of the downscaled, grayscale frame. Calculating the DCT transforms image data of the frame from the spatial domain (i.e., x-y) to the frequency domain, and yields a matrix of DCT coefficients. At block 308, process 300 then includes transposing the DCT. Transposing the DCT involves transposing the matrix of DCT coefficients determined at block 306. Further, at block 310, process 300 then includes calculating the DCT of the transposed DCT. Calculating the DCT of the transposed DCT involves calculating the DCT of the transposed matrix of DCT coefficients, yielding a second matrix of DCT coefficients.

Block 312 of process 300 then includes calculating the absolute value of each coefficient of the second matrix of DCT coefficients, yielding a matrix of absolute values. Further, at block 314, process 300 includes summing the matrix of absolute values and, at block 316, process 300 includes summing the upper-left quarter of the matrix of absolute values. Finally, at block 318, process 300 includes calculating the blur score using the sum of the matrix of absolute values and the sum of the upper-left quarter of the matrix of absolute values. For instance, the blur score can be obtained by subtracting the sum of the upper-left quarter of the matrix of absolute values from the sum of the matrix of absolute values, and dividing the difference by the sum of the matrix of absolute values.

In the second matrix of DCT coefficients, high frequency coefficients are located in the upper-left quarter of the matrix. A frame with a relatively high level of blurriness generally includes a low number of high frequency coefficients, such that the sum of the upper-left quarter of the matrix of absolute values is relatively low, and the resulting blur score is high. Whereas, a frame with a lower level of blurriness, such as a frame with sharp edges or fine-textured features, generally includes more high frequency coefficients, such that the sum of the upper-left quarter is higher, and the resulting blur score is lower.

B. Operations Related to Determining a Contrast Delta

As noted above, contrast module 204 can be configured to determine a contrast delta for a pair of adjacent frames of a video. The contrast delta can quantify a difference between a contrast of a first frame and a contrast a second frame. Contrast can quantify a difference between a maximum intensity and minimum intensity within a frame.

In one example, for each frame of a pair of frames, contrast module 204 can determine a respective contrast score for the frame. Further, contrast module 204 can then determine a contrast delta by comparing the contrast score for a first frame of the pair of frames with a contrast score for a second frame of the pair of frames.

Contrast module 204 can determine a contrast score for a frame in various ways. By way of example, contrast module 204 can determine a contrast score based on a standard deviation of a histogram of pixel intensity values of the frame.

Figure 4:
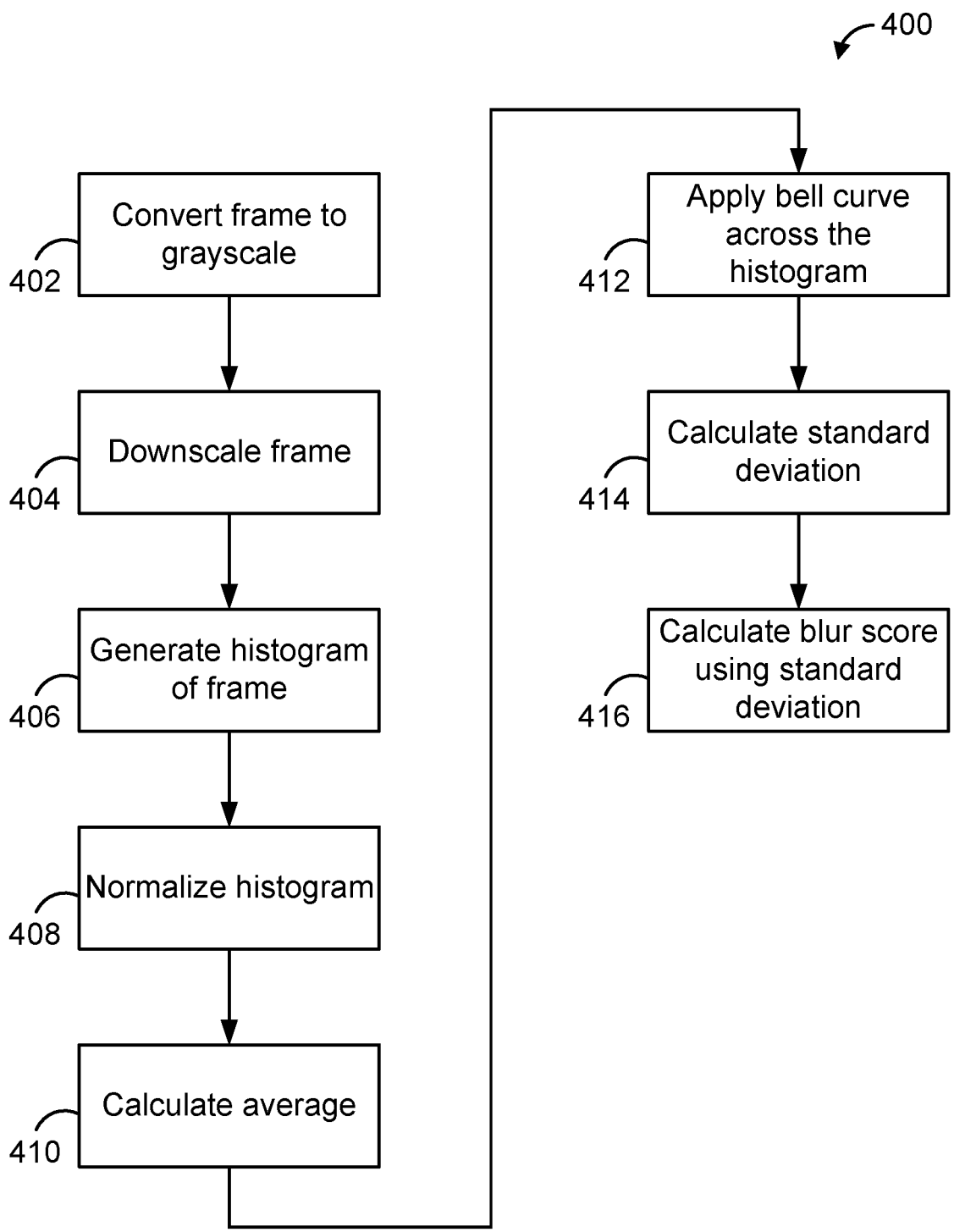
FIG. 4 illustrates an example process for determining a contrast score.

FIG. 4 illustrates an example process 400 for determining a contrast score. Process 400 can be carried out by a computing system, such as contrast module 204 of FIG. 2. As shown in FIG. 4, at block 402, process 400 includes converting a frame to grayscale and, at block 404, process 400 includes downscaling the frame.

Further, at block 406, process 400 includes generating a histogram of the frame. Generating the histogram can involve determining the number of pixels in the frame at each possible pixel value (or each of multiple ranges of possible pixel values). For an 8-bit grayscale image, there are 256 possible pixel values, and the histogram can represent the distribution of pixels among the 256 possible pixel values (or multiple ranges of possible pixel values).

At block 408, process 400 includes normalizing the histogram. Normalizing the histogram can involve dividing the numbers of pixels in the frame at each possible pixel value by the total number of pixels in the frame. At block 410, process 400 includes calculating an average of the normalized histogram. Further, at block 412, process 400 includes applying a bell curve across the normalized histogram. In one example, applying the bell curve can highlight values that are in the gray range. For instance, the importance of values at each side of the histogram (near black or near white) can be reduced, while the values in the center of the histogram are left basically unfiltered. The average calculated at block 410 can be used as the center of the histogram.

At block 414, process 400 then includes calculating a standard deviation of the histogram resulting from block 416. And at block 416, process 400 then includes calculating a blur score using the standard deviation. For instance, the normalized square root of the standard deviation may be used as the contrast score.

In some examples, contrast module 204 can identify a blackframe based on a contrast score for a frame. For instance, contrast module 204 can determine that any frame having a contrast score below a threshold (e.g., 0.1, 0.2, 0.25, etc.) is a blackframe.

C. Operations Related to Determining a Fingerprint Distance

As noted above, fingerprint module 206 can be configured to determine a fingerprint distance for a pair of adjacent frames of a video. The fingerprint distance can be a distance between an image fingerprint of a first frame and an image fingerprint of a second frame.

In one example, for each frame of a pair of frames, fingerprint module 206 can determine a respective image fingerprint for the frame. Further, fingerprint module 206 can then determine a fingerprint distance between the image fingerprint for a first frame of the pair of frames and the image fingerprint for a second frame of the pair of frames. For instance, fingerprint module 206 can be configured to determine a fingerprint distance using a distance measure such as the Tanimoto distance or the Manhattan distance.

Fingerprint module 206 can determine an image fingerprint for a frame in various ways. As one example, fingerprint module 206 can extract features from a set of regions within the frame, and determine a multi-bit signature based on the features. For instance, fingerprint module 206 can be configured to extract Haar-like features from regions of a grayscale version of a frame. A Haar-like feature can be defined as a difference of the sum of pixel values of a first region and a sum of pixel values of a second region. The locations of the regions can be defined with respect to a center of the frame. Further, the first and second regions used to extract a given Haar-like feature may be the same size or different sizes, and overlapping or non-overlapping.

As one example, a first Haar-like feature can be extracted by overlaying a 1×3 grid on the frame, with the first and third columns of the grid defining a first region and a middle column of the grid defining a second region. A second Haar-like feature can also be extracted by overlaying a 3×3 grid on the frame, with a middle portion of the grid defining a first region and the eight outer portions of the grid defining a second region. A third Haar-like feature can also be extracted using the same 3×3 grid, with a middle row of the grid defining a first region and a middle column of the grid defining a second region. Each of the Haar-like features can be quantized to a pre-set number of bits, and the three Haar-like features can then be concatenated together, forming a multi-bit signature.

Further, in some examples, before extracting Haar-like features, a frame can be converted to an integral image, where each pixel is the cumulated values of the pixels above and to the left as well as the current pixel. This can improve the efficiency of the fingerprint generation process.

D. Operations Related to Determining a Keyframe Score

As noted above, analysis module 208 can be configured to determine a keyframe score for a pair of adjacent frames of a video. The keyframe score can be determined using a blur delta for the pair of frames, a contrast delta for the pair of frames, and a fingerprint distance for the pair of frames. For instance, analysis module 208 can determine a keyframe score based on weighted combination of the blur delta, contrast delta, and fingerprint distance.

In one example, for a current frame and a previous frame of a pair of frames, a keyframe score can be calculated using the following formula:

$$keyframeScore = (spatial\_distance * w1) + (blur\_ds * w2) + (constrast\_ds * w3),$$

where:
- spatial_distance is the fingerprint distance score for a current frame and the previous frame,
- w1 is a first weight,
- blur_ds is the delta of the blur score of the current frame and the previous frame,
- w2 is a second weight,
- constrast_ds is the delta of the contrast sore for the current frame and the previous frame, and
- w3 is a third weight.

In one example implementation, the values for w1, w2, and w3, may be 50%, 25%, and 25%, respectively.

Further, in some examples, analysis module 208 can be configured to use a different set of information to derive the keyframe score for a pair of frames. For instance, analysis module 208 can be configured to determine another difference metric, and replace the blur delta, contrast delta, or the fingerprint distance with the other difference metric or add the other difference metric to the weighted combination mentioned above.

One example of another difference metric is an object density delta that quantifies a difference between a number of objects in a first frame and a number of objects in a second frame. The number of objects (e.g., faces, buildings, cars) in a frame can be determined using an object detection module, such as a neural network object detection module or a non-neural object detection module.

Still further, in some examples, rather than using grayscale pixel values to derive the blur delta, contrast delta, and fingerprint distance, analysis module 208 can combine individual color scores for each of multiple color channels (e.g., red, green, and blue) to determine the keyframe score. For instance, analysis module 208 can combine a red blur delta, a red contrast delta, and a red fingerprint distance to determine a red component score. Further, analysis module 208 can combine a blue blur delta, a blue contrast delta, and a blue fingerprint distance to determine a blue component score. And analysis module 208 can combine a green blur delta, a green contrast delta, and a green fingerprint distance to determine a green component score. Analysis module 208 can then combine the red component score, blue component score, and green component score together to obtain the keyframe score.

Analysis module 208 can determine whether a second frame of a pair of frames is a keyframe by determining whether the keyframe score satisfies a threshold condition (e.g., is greater than a threshold). For instance, analysis module 208 can interpret a determination that a keyframe score is greater than a threshold to mean that the second frame is a keyframe. Conversely, analysis module 208 can interpret a determination that a keyframe score is less than or equal to the threshold to mean that the second frame is not a keyframe. The value of the threshold may vary depending on the desired implementation. For example, the threshold may be 0.2, 0.3, or 0.4.

In some examples, analysis module 208 can output data for a video that identifies which frames are keyframes. Optionally, the data can also identify which frames are blackframes. In some instances, the output data can also identify the keyframe scores for the keyframes as well as the keyframe scores for frames that are not determined to be keyframes.

E. Operations Related to Determining Segment Data

As noted above, a computing system can use data regarding the locations of keyframes and blackframes within a video to perform various functions. As one example, a computing system can use data indicating the locations of keyframes and blackframes to refine transition data output by a transition detection classifier. For instance, the transition data may be indicative of locations within a video of transitions between advertisement content and program content. This can include transitions from advertisement content to program content, transitions from program content to advertisement content, transitions from a first advertisement to a second advertisement, and/or transitions from a first program to a second program.

Since the accuracy of the locations of keyframes and blackframes can be accurate at the frame-level, the data regarding the locations of the keyframes and the blackframes can be used to increase the temporal accuracy of the transition data. For example, refining the transition data can involve filtering out all predicted transition times that do not include a corresponding keyframe or blackframe within a few seconds of the predicted transition time and/or adjusting a predicted transition time that is within a few seconds of the location of a keyframe to align with the location of the keyframe.

As another example, a computing system can use the data regarding the locations of keyframes to help detect repetitive content (e.g., an advertisement segment that is repeated over the course of multiple days and/or channels) within a video database. For instance, a computing system can segment a video into segments using the locations of keyframes, and then search for matches to the segments within the video database.

Segmenting a video can involve identifying a portion of the video between adjacent keyframes as a segment. For instance, the data regarding keyframes can identify a first keyframe and a second keyframe, and the computing system can determine that a portion of the video spanning from the first keyframe to a frame prior to and adjacent to the second keyframe is a segment.

Searching for a match to a query segment within the video database can involve generating an audio or video fingerprint from the query segment, and searching for a matching segment within the video database using the audio or video fingerprint. The video database may be indexed using audio or video fingerprints to facilitate the matching process.

As another example, a computing system can use the data regarding the locations of keyframes to identify a representative segment of a video. For instance, the computing system can use the data regarding the locations of keyframes to identify a segment of a movie to be included in a trailer for the movie. In one approach, the computing system can determine which fixed-length segment of the movie has a highest number of keyframes, and select the fixed-length segment as a representative segment for the video. The movie may be an action movie, and the presence of a large number of keyframes within the segment may be indicative of the fixed-length segment being an action-packed segment.

Similarly, the computing system can use keyframe scores for frames of a video to identify a representative segment of a video. For instance, after segmenting a video into multiple segments using keyframes, the computing system can analyze the keyframe scores of frames within each segment. For example, for each of multiple segments, the computing system can determine an average keyframe score. Further, the computing system can then select the segment having the maximum average keyframe score as a representative segment for the video.

F. Example Method

Figure 5:
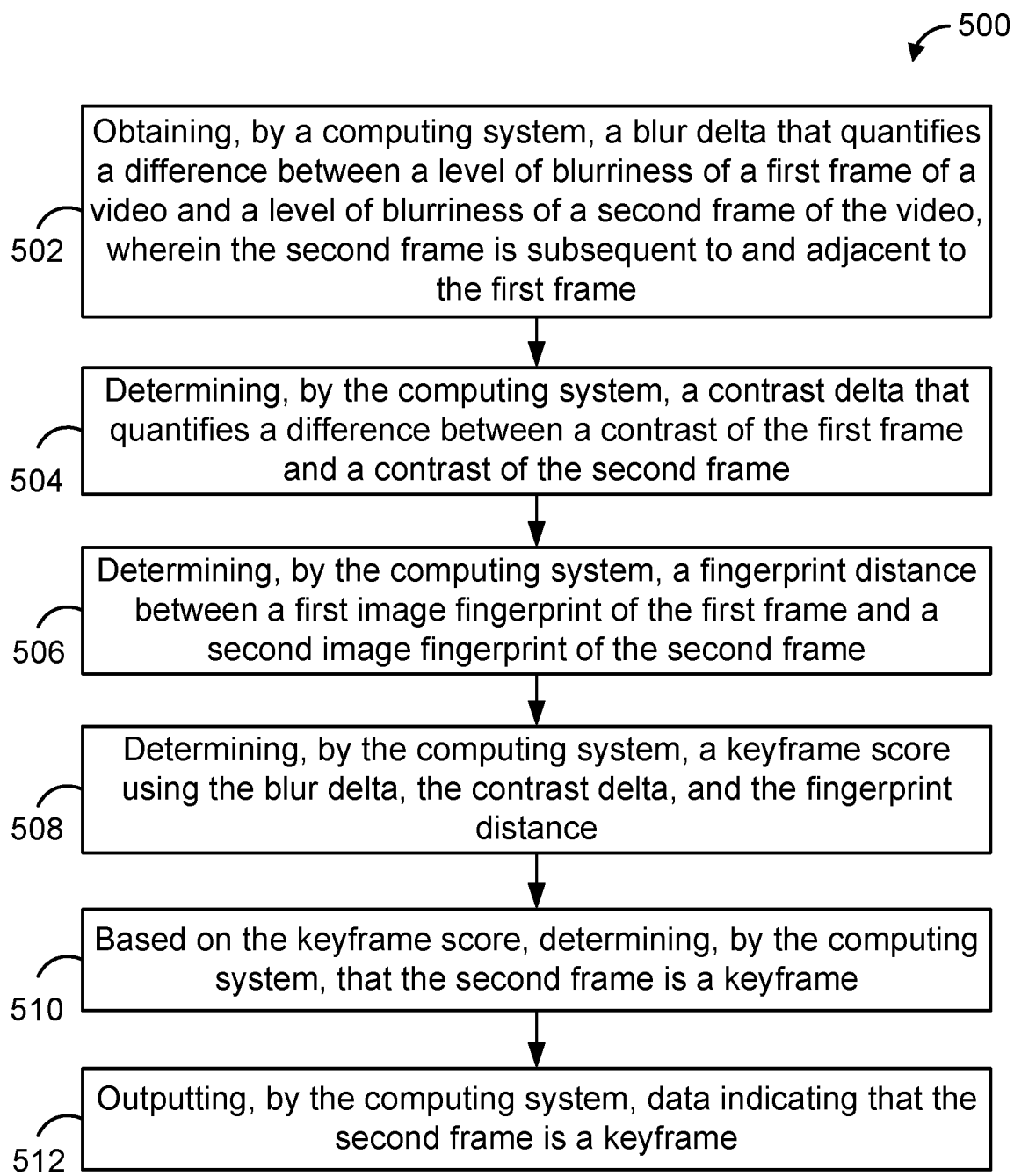
FIG. 5 is a flow chart of an example method.

FIG. 5 is a flow chart of an example method 500. Method 500 can be carried out by a computing system, such as computing system 200 of FIG. 2. At block 502, method 500 includes obtaining, by a computing system, a blur delta that quantifies a difference between a level of blurriness of a first frame of a video and a level of blurriness of a second frame of the video, with the second frame being subsequent to and adjacent to the first frame. At block 504, method 500 includes determining, by the computing system, a contrast delta that quantifies a difference between a contrast of the first frame and a contrast of the second frame. At block 506, method 500 includes determining, by the computing system, a fingerprint distance between a first image fingerprint of the first frame and a second image fingerprint of the second frame. At block 508, method 500 includes determining, by the computing system, a keyframe score using the blur delta, the contrast delta, and the fingerprint distance. At block 510, the method 500 includes, based on the keyframe score, determining, by the computing system, that the second frame is a keyframe. And at block 512, method 500 includes outputting, by the computing system, data indicating that the second frame is a keyframe.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
  determining, by a computing system, a first blur score for a first frame of a video based on a discrete cosine transform (DCT) of pixel intensity values of the first frame by:
    converting the first frame to grayscale;
    downscaling the grayscale first frame;
    calculating a first DCT of the grayscale, downscaled first frame to determine a first matrix of DCT coefficients;
    transposing the first matrix of DCT coefficients;
    calculating a second DCT of the transposed first matrix of DCT coefficients to determine a second matrix of DCT coefficients; and
    calculating the first blur score for the first frame by subtracting a sum of the absolute values of the upper-left quarter of the second matrix of DCT coefficients from a sum of the absolute values of the coefficients of the second matrix of DCT coefficients;
  determining, by the computing system, a second blur score for a second frame of the video based on a DCT of pixel intensity values of the second frame by:
    converting the second frame to grayscale;
    downscaling the grayscale second frame;
    calculating a third DCT of the grayscale, downscaled second frame to determine a third matrix of DCT coefficients;
    transposing the third matrix of DCT coefficients;
    calculating a fourth DCT of the transposed third matrix of DCT coefficients to determine a fourth matrix of DCT coefficients; and
    calculating the second blur score for the second frame by subtracting a sum of the absolute values of the upper-left quarter of the fourth matrix of DCT coefficients from a sum of the absolute values of the coefficients of the fourth matrix of DCT coefficients;
  determining, by the computing system, a blur delta that quantifies a difference between a level of blurriness of the first frame of the video represented by the first blur score and a level of blurriness of the second frame of the video represented by the second blur score, wherein the second frame is subsequent to and adjacent to the first frame;
  determining, by the computing system, a contrast delta that quantifies a difference between a contrast of the first frame and a contrast of the second frame;
  determining, by the computing system, a fingerprint distance between a first image fingerprint of the first frame and a second image fingerprint of the second frame;
  determining, by the computing system, a keyframe score using the blur delta, the contrast delta, and the fingerprint distance;
  based on the keyframe score, determining, by the computing system, that the second frame is a keyframe; and
  outputting, by the computing system, data indicating that the second frame is a keyframe.

2. The method of claim 1, wherein determining the contrast delta comprises:
  determining a contrast score for the first frame based on a standard deviation of a histogram of pixel intensity values of the first frame; and
  determining a contrast score for the second frame based on a standard deviation of a histogram of pixel intensity values of the second frame.

3. The method of claim 2, further comprising:
  determining, based on the contrast score for the second frame, that the second frame is a blackframe; and outputting data indicating that the second frame is a blackframe.

4. The method of claim 1, wherein:
the first image fingerprint is based on features extracted from a set of regions of the first frame; and
the second image fingerprint is based on features extracted from a set of regions of the second frame.

5. The method of claim 1, wherein determining that the second frame is a keyframe comprises determining that the keyframe score satisfies a threshold condition.

6. The method of claim 1, further comprising using the data indicating that the second frame is a keyframe to refine transition data output by a transition detection classifier, wherein the transition data is indicative of locations within the video of transitions between advertisement content and program content.

7. The method of claim 1, further comprising:
identifying a third frame of the video as a keyframe based on a keyframe score for the third frame and a fourth frame of the video that is prior to and adjacent to the third frame;
identifying a segment of the video between the second frame and the fourth frame as a query segment; and
searching for a match to the query segment within a video database.

8. A non-transitory computer-readable medium having stored thereon program instructions that upon execution by a processor, cause performance of a set of acts comprising:
determining a first blur score for a first frame of a video based on a discrete cosine transform (DCT) of pixel intensity values of the first frame by:
converting the first frame to grayscale;
downscaling the grayscale first frame;
calculating a first DCT of the grayscale, downscaled first frame to determine a first matrix of DCT coefficients;
transposing the first matrix of DCT coefficients;
calculating a second DCT of the transposed first matrix of DCT coefficients to determine a second matrix of DCT coefficients; and
calculating the first blur score for the first frame by subtracting a sum of the absolute values of the upper-left quarter of the second matrix of DCT coefficients from a sum of the absolute values of the coefficients of the second matrix of DCT coefficients;
determining a second blur score for a second frame of the video based on a DCT of pixel intensity values of the second frame by:
converting the second frame to grayscale;
downscaling the grayscale second frame;
calculating a third DCT of the grayscale, downscaled second frame to determine a third matrix of DCT coefficients;
transposing the third matrix of DCT coefficients;
calculating a fourth DCT of the transposed third matrix of DCT coefficients to determine a fourth matrix of DCT coefficients; and
calculating the second blur score for the second frame by subtracting a sum of the absolute values of the upper-left quarter of the fourth matrix of DCT coefficients from a sum of the absolute values of the coefficients of the fourth matrix of DCT coefficients;
determining a blur delta that quantifies a difference between a level of blurriness of the first frame of the video represented by the first blur score and a level of blurriness of the second frame of the video represented by the second blur score, wherein the second frame is subsequent to and adjacent to the first frame;
determining a contrast delta that quantifies a difference between a contrast of the first frame and a contrast of the second frame;
determining a fingerprint distance between a first image fingerprint of the first frame and a second image fingerprint of the second frame;
determining a keyframe score using the blur delta, the contrast delta, and the fingerprint distance;
based on the keyframe score, determining that the second frame is a keyframe; and
outputting data indicating that the second frame is a keyframe.

9. The non-transitory computer-readable medium of claim 8, wherein determining the contrast delta comprises:
determining a contrast score for the first frame based on a standard deviation of a histogram of pixel intensity values of the first frame; and
determining a contrast score for the second frame based on a standard deviation of a histogram of pixel intensity values of the second frame.

10. The non-transitory computer-readable medium of claim 9, wherein the set of acts further comprises:
determining, based on the contrast score for the second frame, that the second frame is a blackframe; and
outputting data indicating that the second frame is a blackframe.

11. The non-transitory computer-readable medium of claim 8, wherein:
the first image fingerprint is based on features extracted from a set of regions of the first frame; and
the second image fingerprint is based on features extracted from a set of regions of the second frame.

12. The non-transitory computer-readable medium of claim 8, wherein the set of acts further comprises using the data indicating that the second frame is a keyframe to refine transition data output by a transition detection classifier, wherein the transition data is indicative of locations within the video of transitions between advertisement content and program content.

13. A computing system comprising:
a processor; and
a non-transitory computer-readable medium, having stored thereon program instructions that upon execution by the processor, cause the computing system to perform a set of acts comprising:
determining a first blur score for a first frame of a video based on a discrete cosine transform (DCT) of pixel intensity values of the first frame by:
converting the first frame to grayscale;
downscaling the grayscale first frame;
calculating a first DCT of the grayscale, downscaled first frame to determine a first matrix of DCT coefficients;
transposing the first matrix of DCT coefficients;
calculating a second DCT of the transposed first matrix of DCT coefficients to determine a second matrix of DCT coefficients; and
calculating the first blur score for the first frame by subtracting a sum of the absolute values of the upper-left quarter of the second matrix of DCT coefficients from a sum of the absolute values of the coefficients of the second matrix of DCT coefficients;

determining a second blur score for a second frame of the video based on a DCT of pixel intensity values of the second frame by:
  converting the second frame to grayscale;
  downscaling the grayscale second frame;
  calculating a third DCT of the grayscale, downscaled second frame to determine a third matrix of DCT coefficients;
  transposing the third matrix of DCT coefficients;
  calculating a fourth DCT of the transposed third matrix of DCT coefficients to determine a fourth matrix of DCT coefficients; and
  calculating the second blur score for the second frame by subtracting a sum of the absolute values of the upper-left quarter of the fourth matrix of DCT coefficients from a sum of the absolute values of the coefficients of the fourth matrix of DCT coefficients;
determining a blur delta that quantifies a difference between a level of blurriness of the first frame of the video represented by the first blur score and a level of blurriness of the second frame of the video represented by the first blur score, wherein the second frame is subsequent to and adjacent to the first frame;
determining a contrast delta that quantifies a difference between a contrast of the first frame and a contrast of the second frame;
determining a fingerprint distance between a first image fingerprint of the first frame and a second image fingerprint of the second frame;
determining a keyframe score using the blur delta, the contrast delta, and the fingerprint distance;

based on the keyframe score, determining that the second frame is a keyframe; and
outputting data indicating that the second frame is a keyframe.

14. The computing system of claim 13, wherein determining the contrast delta comprises:
  determining a contrast score for the first frame based on a standard deviation of a histogram of pixel intensity values of the first frame; and
  determining a contrast score for the second frame based on a standard deviation of a histogram of pixel intensity values of the second frame.

15. The computing system of claim 14, wherein the set of acts further comprises:
  determining, based on the contrast score for the second frame, that the second frame is a blackframe; and
  outputting data indicating that the second frame is a blackframe.

16. The computing system of claim 13, wherein:
  the first image fingerprint is based on features extracted from a set of regions of the first frame; and
  the second image fingerprint is based on features extracted from a set of regions of the second frame.

17. The computing system of claim 13, wherein the set of acts further comprises using the data indicating that the second frame is a keyframe to refine transition data output by a transition detection classifier, wherein the transition data is indicative of locations within the video of transitions between advertisement content and program content.

* * * * *